Patented Dec. 30, 1947

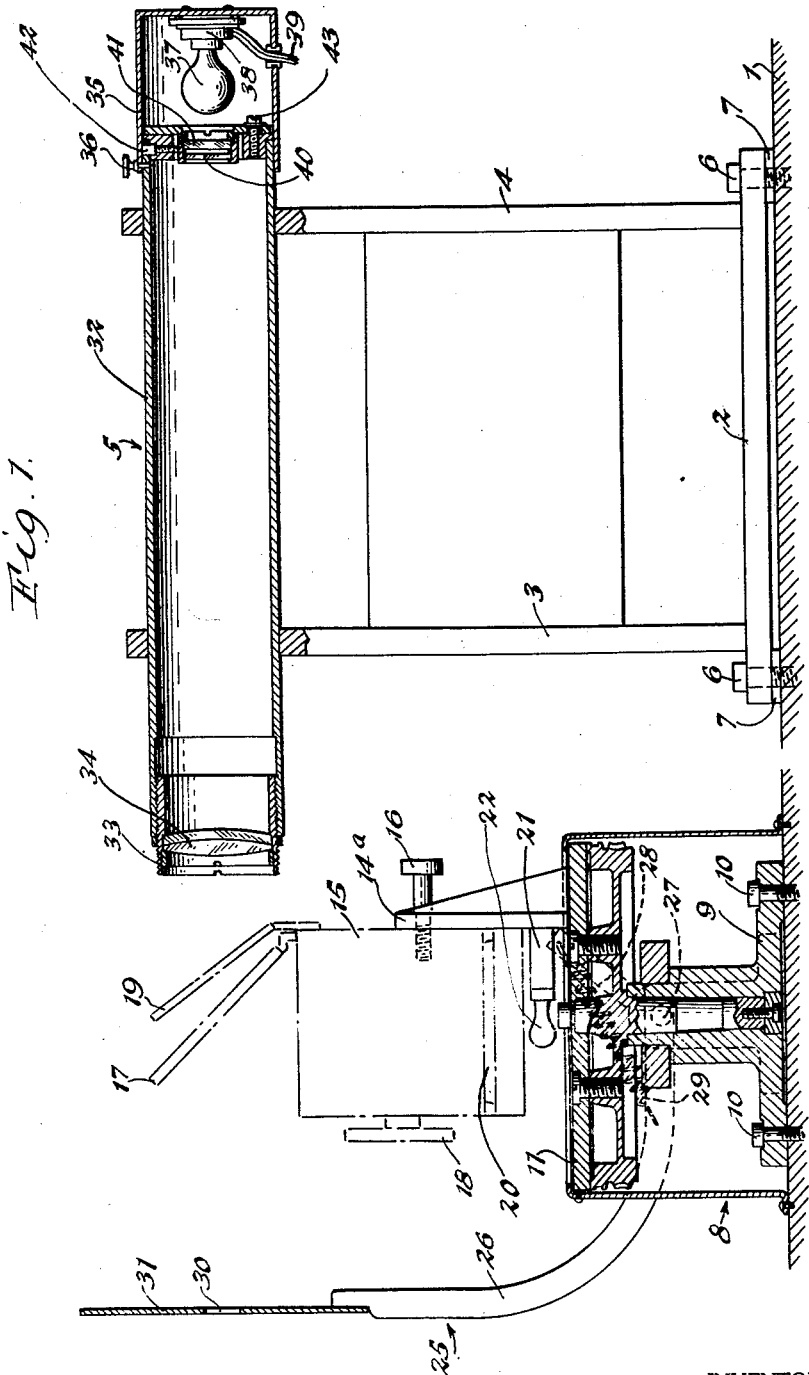

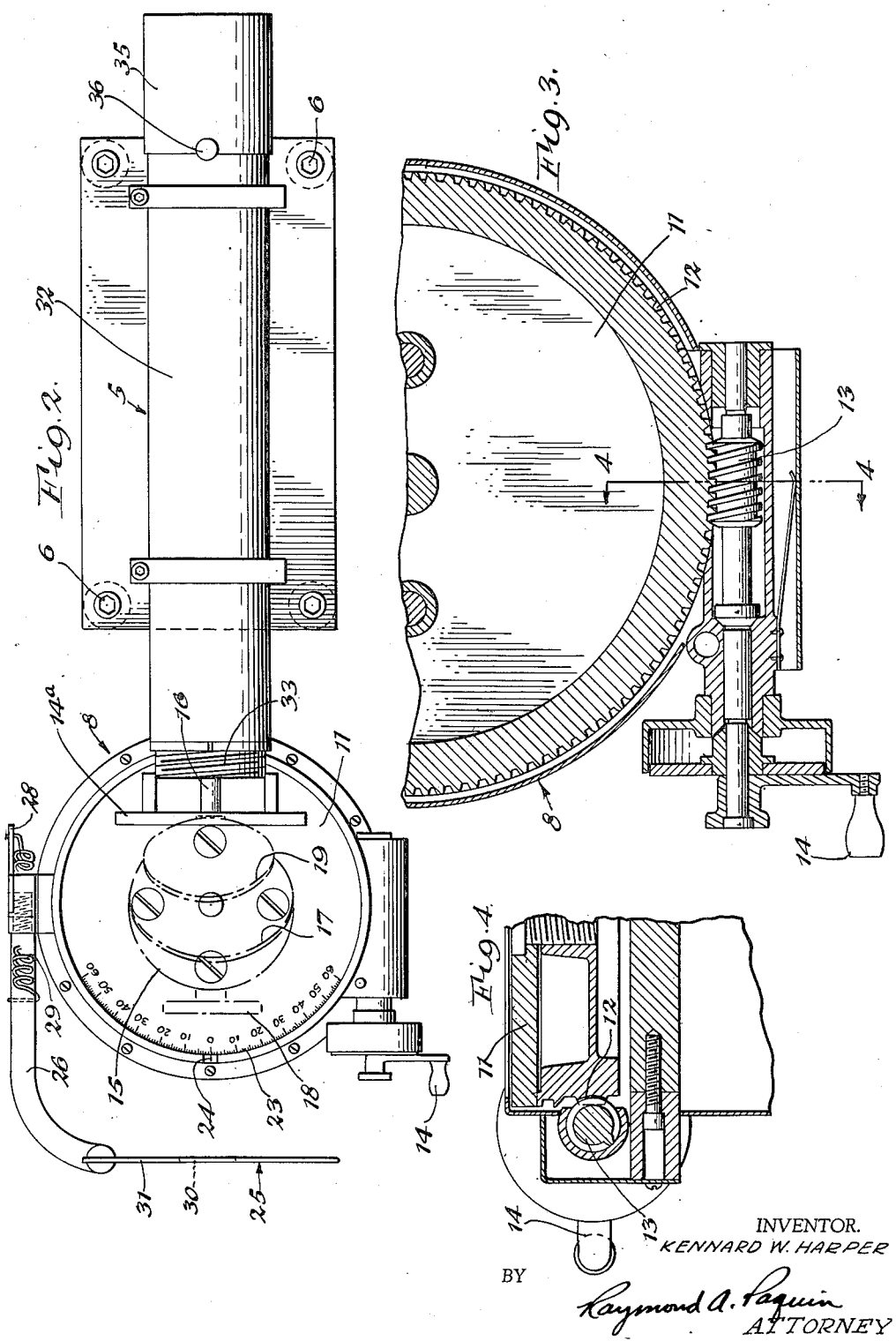

2,433,452

UNITED STATES PATENT OFFICE 2,433,452

METHOD AND APPARATUS FOR CHECKING THE ACCURACY OF GRADUATED CIRCLES OF OPTICAL INSTRUMENTS

Kennard W. Harper, East Aurora, N. Y., assignor, by mesne assignments, to American Optical Company, Southbridge, Mass., a voluntary association Application May 28, 1943, Serial No. 488,911

5 Claims. (Cl. 88—1)

This invention relates to an inspection method and apparatus and has particular reference to a new and improved inspection means for optical instruments having graduated circles such as sextants, transits, gun sights and other similar types of devices and a method of checking the accuracy of such graduated circles.

An object of the invention is to provide a new and improved inspection method and means for use in connection with instruments having graduated circles and which enables the checking of the graduations on the instrument against a standard.

Another object of the invention is to provide a device and method of the type set forth which allows a rapid and accurate checking of the graduations on the instrument under test with the graduations on a standard.

Another object of the invention is to provide a device of the type set forth which is efficient in operation and relatively economical in construction.

Another object of the invention is to provide a device of the type set forth having means for testing instruments of the character referred to in such a way that errors due to parallax will be eliminated.

Another object of the invention is to provide a device of the type set forth with means for easily and quickly securing the instrument to be tested in position on the testing apparatus and for removing the instrument from the apparatus after the test.

Other objects and advantages of the invention will be apparent from the following description taken in connection with the accompanying drawings. It will be understood that many changes may be made in the details of construction, arrangement of parts, and steps of the process without departing from the scope of the invention as set forth in the accompanying claims. I, therefore, do not wish to be limited to the exact details of construction, arrangement of parts, and steps of the process shown and described as the preferred form has been given by way of illustration only.

Referring to the drawings:

Fig. 1 is a sectional view of an apparatus constructed according to my invention.

Fig. 2 is a top or plan view of the apparatus shown in Fig. 1.

Fig. 3 is a fragmentary sectional view on an enlarged scale of the apparatus shown in Figs. 1 and 2; and Fig. 4 is a sectional view taken on line 4—4 of Fig. 3 looking in the direction of the arrows.

In the construction of optical devices such as sextants, transits, movable gun sights or similar types of instruments having azimuth or graduated circles it is necessary that the movable reflector of such sighting devices be accurately positioned at the exact angular degree specified by the graduated circle. It will be readily apparent that if the graduated circle is set for a specified angle and the reflector is not at the angle specified by the graduated circle, that the instrument would not be sufficiently accurate for many uses and any such lack of accuracy might seriously affect the results obtained with the instrument. It will therefore be seen that it is necessary that such reflectors be accurately related with the graduated circles and the present method and apparatus have been found more practical than those formerly employed for checking such accuracy. It is therefore the principal object of the present invention to provide a new and improved method and apparatus for checking the graduations on the instruments against a standard to insure the accuracy of the instrument graduations.

Referring more particularly to the drawings wherein similar reference characters designate corresponding parts throughout the several views, an apparatus embodying the invention and for carrying out the process comprises a base 1 which may be a table top or the like and on which is placed the supporting member 2 having the uprights 3 and 4 for supporting the collimator 5 and said support 2 is adapted to be secured to the table or the like 1 by means of the screws or the like 6. Between the lower surface of the support 2 and the surface of the base 1 are provided the washer members 7 for positioning the supports 3 and 4 to properly align the collimator 5 with a reflection as will be presently described.

Also secured on said support member 1 and in aligned relation with the collimator member 5 is an assembly 8 which comprises the base 9 which base 9 is secured to the table 1 by means of the screws or the like 10.

The base 9 pivotally supports a rotary table 11 in such a position that its axis of rotation extends vertically and intersects the optical axis of the collimator 5. The table 11 is adapted to be rotated by means of the worm gear 12 on the periphery of said table 11 and the worm member 13 which is adapted to be driven by the hand wheel 14.

Secured on the upper surface of said table member 11 and adjacent the side thereof toward the adjacent end of the collimator member 5 is the upright support or bracket member 14a adapted to support the instrument under test 15 by means of the screw member 16 which extends through said upright bracket 14a and is threaded into a threaded opening in the side of the instrument 15. While this screw arrangement is shown for supporting the instrument 15 on the upright 14a other suitable supporting devices could be employed for supporting the instrument 15 in engagement with said upright 14a to allow rotary adjustment of said instrument 15 upon rotation of the table 11 through the gear 12 and worm 13 as previously described.

The instrument 15 is provided with the sighting means or reflector member 17 which is secured adjacent one end thereof to the upper end of the instrument 15 and is adapted to be rotated relative to said instrument 15 by means of the hand wheel 18 which hand wheel is provided with the graduated circle and which wheel 18 is connected to said reflector member 17 by gear means (not shown) so that upon rotation of said member 18 the reflector 17 will be rotated about a vertical axis and moved relative to the instrument 15. The reflector 17 may be a plate glass reflector or could be a transparent reflector or partial reflector, that is a glass disc having a transparent coating of silver or aluminum to provide the reflective surface.

Adjacent said reflector member 17 there may be provided a sun filter or the like 19 which reduces the intensity of the illumination.

In the instrument 15 is the reticule 20 and on the upright 14a is the lamp support 21 adapted to support the lamp 22 beneath the center of the instrument 15 which has a vertical opening therethrough aligned with said reticule 20 and the axis of rotation of the reflector 17 so that light from the lamp 22 by means of the usual lens system of the gun sight, transit or the like projects an image of the reticule 20 on the reflector 17.

The upper surface of the table 11 is provided with the graduations 23 and an index 24 is provided against which these graduations may be read.

While the graduations may be such as are necessary for the particular type of instrument to be tested, for the type of device shown it is preferable that such graduations be in one degree steps from 0 to 60 degrees in both directions although the graduations could extend completely around the periphery of the table if desired.

When it is desirable or essential in the use of the apparatus that the possibility of errors due to parallax be eliminated, the diaphragm assembly 25 may be employed. This diaphragm assembly 25 comprises an arm 26 which is pivoted at 27. An offset bracket 28 supports one end of a spring member 29 normally urging said arm to pivot upwardly and move a diaphragm member 31 out of the line of sight of the reflector 17 and the optical axis of the collimator so that in order to use said diaphragm member it is necessary to pull the support 26 downwardly against the action of the spring 29 and then by so holding the arm 26 it is possible to sight through a central opening 30 in the member 31 and when the arm 26 is in its lowered position the opening 30 will be aligned with the axis of the collimator member 5. This diaphragm member is not ordinarily required where an instrument of narrow aperture is being tested, but in the case of some gun sights for instance, it may be found desirable to eliminate parallax as a source of error and in such case the diaphragm member is employed for the above mentioned purpose, that is, to restrict the amount of movement of the operator's head during his use of the instrument.

The collimator member 5 comprises the tubular member 32 having the focusable cell 33 containing the objective lens system 34 adjacent the forward end of the tubular member 32 and adjacent the opposite end of said tubular member 32 is the detachable member 35 which is adapted to be retained in position on the end of the tubular member 32 by means of the thumb screw or the like 36.

This attachment contains the lamp 37 in the socket 38 adapted to receive current through the leads 39. In the far end of the member 32 is also provided the reticule member 40 and filter 41 which may be a daylight filter or could be a green filter for contrast or for certain cases could be a ground glass diffusing filter. The reticule centering device 42 is provided for the centering of the reticule and the lock screw 43 is provided for locking the parts in assembled relation.

In the use of the device the instrument to be tested is first secured to the upright 14a, on the table 11 by means of the screw 16 or other suitable means, as previously described, with the line of sight of the instrument located in the horizontal plane containing the optical axis of the collimator 5. The zero indication mark of scale 23 on the table 11 is then aligned with the fixed index mark 24. If the graduated circle 18 of the instrument were then set at zero, the images of reticules 20 and 40 would appear in alignment. To check the calibrations of the instrument scale the device may then be used in the following manner. The graduated circle 18 may first be turned to rotate the reflector 17, and thus the line of sight, through any desired number of degrees and then by means of the hand wheel 14 the table 11 may be rotated to rotate the instrument 15 and the reflector 17 thereon in the opposite direction until the image of reticule 20 again appears in alignment with the image of reticule 40. If the reading on the graduated circle 18 and the reading on the scale 23 are the same, the graduation on the instrument which is being checked is correct and will indicate correctly the amount of angular adjustment of the reflector 17 relative to the instrument.

Another way in which substantially the same test could be effected would be to align the zero mark of the scale 23 with the index 24 and also align the zero mark on the graduated circle 18 with the index for said circle, as in the previous example, and this causes the images of the reticules to appear in alignment. Then the table 11 is rotated and this rotates the instrument 15 and reflector 17 a desired number of degrees. The graduated circle 18 is then rotated in the opposite direction the same number of degrees, as indicated by the graduations of the graduated circle. The reticule images are then observed to determine whether the original alignment thereof has been restored. If the images are not aligned, the graduations of the graduated circle are inaccurate.

From the foregoing it will be seen that I have provided a simple, efficient and economical device for obtaining all of the objects and advantages of the invention.

Having described my invention, I claim:

1. In apparatus for determining the accuracy of the calibrations of a scale or index of an optical instrument having rotatable sighting means and a reticule axially aligned therewith and in which instrument said scale or index is arranged to indicate a zero setting for the rotatable sighting means of the instrument as well as amounts of angular displacement of said sighting means from said zero setting, the combination with a collimator having a reticule, of a rotatable support for said instrument, said support being so positioned relative to the collimator that its axis of rotation substantially intersects the optical axis of the collimator and is disposed at a substantial angle relative thereto, means on said rotatable support for holding said optical instrument in a position so that the axis of rotation of the sighting means of the instrument is coincident with the axis of rotation of the support, and so that the line of sight of the sighting means may be rotated into coincidence with the axis of said collimator, a standardized scale or index associated with said rotatable support for indicating a zero setting of said support and amounts of angular displacement of said support relative thereto, said zero setting of the support being arranged to align the instrument under test relative to the collimator so that when the sighting means is also at its zero setting the line of sight of the instrument will be coincident with the optical axis of said collimator and the images of said reticules will appear aligned.

2. In inspection apparatus of the class described the combination with a collimator having a reticule, of a rotatable support for an instrument of the type having a rotatable sighting means, a scale or index associated therewith for indicating a zero setting for the line of sight of said sighting means as well as amounts of angular displacement of the line of sight from said zero setting and a reticule axially aligned with said sighting means, said rotatable support being so related to said collimator that its axis of rotation passes substantially through the optical axis of the collimator and is disposed at a substantial angle relative thereto, means for mounting said instrument on said support so that the axis of rotation of the sighting means of the instrument is coincident with the axis of rotation of the support, and so that said line of sight may be rotated into coincidence with the optical axis of said collimator for causing the images of said reticules to appear aligned, and a standardized scale or index associated with said rotatable support for indicating a zero setting for the support and the instrument under test as well as amounts of angular displacement of said support and instrument from the zero setting thereof.

3. In inspection apparatus of the class described the combination with a collimator having a reticule, of a rotatable support for an instrument of the type having a rotatable sighting means, a scale or index associated therewith for indicating a zero setting for the line of sight of said sighting means as well as amounts of angular displacement of the line of sight from said zero setting and a reticule axially aligned with said sighting means, said rotatable support being so related to said collimator that its axis of rotation passes substantially through the optical axis of the collimator and is disposed at a substantial angle relative thereto, means for mounting said instrument on said support so that the axis of rotation of the sighting means of the instrument is coincident with the axis of rotation of the support, and so that said line of sight may be rotated into coincidence with the optical axis of said collimator for causing the images of said reticules to appear aligned, a standardized scale or index associated with said rotatable support for indicating a zero setting for the support and the instrument under test as well as amounts of angular displacement of said support and instrument from the zero setting thereof, and a sighting device for properly positioning the operator's eye for sighting along the optical axis of the collimator.

4. In inspection apparatus of the class described the combination with a collimator having a reticule, of a rotatable supporting member for an instrument of the type having a rotatable semi-transparent reflecting sighting member, a reticule axially aligned with the axis of rotation of said reflecting member and a scale or index associated with said reflecting member for indicating a zero setting of said reflecting member relative to said instrument as well as amounts of angular displacement of said reflecting member and its line of sight from said zero setting, said rotatable supporting member being so related to said collimator that its axis of rotation passes approximately through the optical axis of said collimator and is disposed at a substantial angle relative thereto, means for mounting said instrument on said supporting member so that the axis of rotation of said reflecting member is coincident with the axis of rotation of said supporting member, and so that said line of sight may be rotated into coincidence with the optical axis of said collimator to thereby cause the images of said reticules to appear aligned, and a standardized scale or index associated with said supporting member for indicating a zero setting of the supporting member and the instrument supported thereby as well as amounts of angular displacement of said supporting member and instrument from the zero setting thereof, whereby the accuracy of the calibrations of said scale or index of said instrument may be checked against the calibrations of said standardized scale by rotative adjustments of said supporting means and the instrument supported thereby.

5. The method of checking the accuracy of the calibrations of a scale associated with the rotatable sighting member of an instrument against the calibrations of a standardized scale associated with the rotatable supporting member of a testing device, comprising securing the instrument to be checked in a fixed position on said rotatable supporting member so that the axis of rotation of said sighting member is in coincidence with the axis of rotation of said supporting member and intersects the axis of a collimator associated therewith at a substantial angle, said collimator having a reticule and said instrument containing a reticule in alignment with the axis of rotation of said sighting member, said instrument also being so positioned that its sighting member may be rotated about its axis of rotation to bring its line of sight into coincidence with the axis of said collimator and thereby cause the images of said reticules to appear aligned, the scales on said instrument and said supporting member each being arranged so as to indicate a zero setting thereof when said images are so aligned, adjusting said rotatable supporting member and said rotatable sighting member into respective zero settings, then rotating one of said members a desired amount to angularly displace said line of sight an angular distance from the axis of said collimator corresponding to a predetermined number of calibrations on the scale associated with said member, then rotating the other of said members in the opposite direction an angular distance equal to the first angular distance as indicated by the calibrations on the scale associated with said other member, and then observing said reticules to determine whether or not they are in substantial alignment, whereby the accuracy of the individual calibration under test may be determined.

KENNARD W. HARPER.

REFERENCES CITED

The following references are of record in the file of this patent:

UNITED STATES PATENTS

| Number | Name | Date |
|---|---|---|
| 2,129,130 | Hammer | Sept. 6, 1938 |